Patented Dec. 17, 1929

1,739,662

UNITED STATES PATENT OFFICE

FRIEDRICH BOEDECKER, OF BERLIN-DAHLEM, GERMANY

BARBITURIC ACID DERIVATIVE

No Drawing. Application filed November 21, 1925, Serial No. 70,699, and in Germany December 6, 1924.

The present invention concerns a process for increasing the soporific (or sleep-producing) effect of CC disubstituted barbituric acids.

It is known that those CC disubstituted barbituric acids in which a methylene hydrogen (of the malonic acid radical) is substituted by an unsaturated radical, or residue, represent good hypnotics. I have now found out that the soporific action of such barbituric acid derivatives can be vastly increased, if the second hydrogen atom of the methylene group is replaced by a group of the formula

in which $R^1$ and $R^2$ represent two different radicals, either or both of which can be aliphatic, aromatic or alicyclic. These two different radicals $R^1$ and $R^2$ are then connected to the barbituric acid residue by means of an asymmetric carbon atom, and it appears probable that this fact plays a part in increasing the soporific action. It has been established by experiments, that of the possible isomeric barbituric acid derivatives of a definite composition, only those show the outstanding increase in soporific action which possess this asymmetric carbon atom, in which $R^1$ and $R^2$ therefore represent different radicals. This has shown itself, for example, especially clear in the barbituric acid which contains besides the $\beta$-bromallyl group in the methylene group, the residue of methyl propyl carbinol. This compound shows soporific effects in considerably smaller doses than its two isomers, in which the second methylene hydrogen is replaced by the residue of diethyl carbinol or secondary butyl carbinol. In the two last named compounds, on the one hand, a residue derived from a primary alcohol is joined to the methylene carbon atom, and on the other hand, a residue of the formula

in which the two radicals R are alike. In equal parts by weight, of two isomers, the compound with the asymmetric carbon atom causes one or more hours longer sleep. The process is in general carried on according to the general processes for the preparation of CC disubstituted barbituric acids. For the purpose of introduction of the $\beta$-halogenallyl residues, it is not necessary at first, as I have shown in application, Serial No. 739,426 filed September 23, 1924, to use 1,2-dibrom-2,3-propylen- $CH_2Br-CBr=CH_2$. On the contrary, one can proceed from the 1,2,3, trihalogenpropan in the preparation of the product by suitable addition of alkali.

In combination with antipyretics, as for example, dimethylaminophenazon, the aforesaid compounds represent excellent efficient analgesics.

In the following examples, "parts by weight" and "parts by volume" can be taken as representing respectively grams and cubic centimeters, or respectively kilos and litres, or other similarly related units.

Example 1

Butyl-barbaturic acid is prepared in the usual way. Thus 69 parts by weight of sodium, 690 parts by volume of absolute alcohol and 216 parts by weight of secondary butylmalonic acid diethyl ester, (B. P. 115-116° C., 12 mm. density at 14° C.=0.988) are condensed with 90 parts by weight of urea. The sodium salt thereby formed is, after vaporization of the excess alcohol, dissolved in 750 parts by volume of water and the solution is supersaturated with 300 parts by volume of aqueous hydrochloric acid (sp. gr. 1.19), whereby precipitated secondary butyl barbituric acid crystallizes from the water in silvery lustrous plates (melting at 194-195° C.).

184 parts secondary butyl-barbituric acid (melting point 194-195° C.) are dissolved in 500 parts by volume of double normal (i. e.

8%) sodium hydroxide solution and with 205 parts 2, 3, dibrompropylene at a rather high temperature (say 80 to 100° C.) and is intensively stirred for several hours.

The semi-solid precipitated reaction product is extracted with a little hot chloroform. It thereby falls to pieces into fine colorless crystals, which by recrystallization from water or from dilute acetic acid can be obtained pure. The secondary butyl-β-bromallyl-barbituric acid formed has a melting point 131–132° C. It is easily soluble in alcohol, ether, acetone, benzol, totuol, acetic ester (ethyl acetate), glacial acetic acid, even in the cold; rather difficultly soluble in water, hexahydrotoluene, and chloroform, but insoluble in petroleum ether.

The reaction may be expressed as follows:—

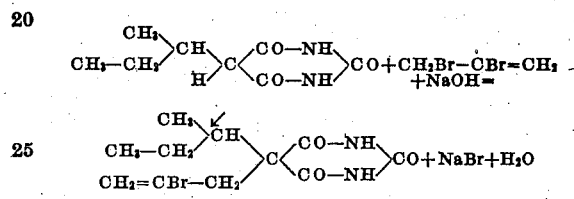

The arrow indicates the asymmetric carbon atom.

*Example II*

A sodium malonic-ester solution made from 4.4 parts sodium, 60 parts by volume of alcohol and 31 parts malonic acid is refluxed with 38 parts β-iodo-n-pentane for six hours, on a water bath. Then the alcohol is distilled off, the residue taken up with water, extracted with ether and dried over $Na_2SO_4$. After distilling off the ether, the methyl-n-propylmethylmalonic ester boils in a vacuum (13 mm.) at 122–125° C.

To an alcoholate produced from 9.9 parts of sodium and 120 parts by volume of absolute alcohol, 12.4 parts of urea and 33 parts methyl-n-propyl-methylmalonic ester are added and heated for eight hours upon a water bath. After distilling off the alcohol, the residue is taken up with water, the methyl-n-propyl-methyl barbituric acid precipitated with dilute hydrochloric acid and after drying, is recrystallized from acetic acid of about 60% concentration. It melts at 162–163° C.

38 parts methyl-n-propyl-methylbarbituric acid are dissolved in 120 parts by volume of aqueous sodium hydroxide solution of about 6.6% strength, and warmed with 40 parts of β-bromallyl-bromide for a day with stirring. After cooling, the crystallized methyl-n-propyl carbin-β-bromallyl-barbituric acid is sucked off and precipitated out of dilute alkali solution after filtration. Finally it is recrystallized from slightly dilute acetic acid and melts at 164–165° C., it is soluble in most of the organic solvents.

The reactions taking place can be expressed as follows:—

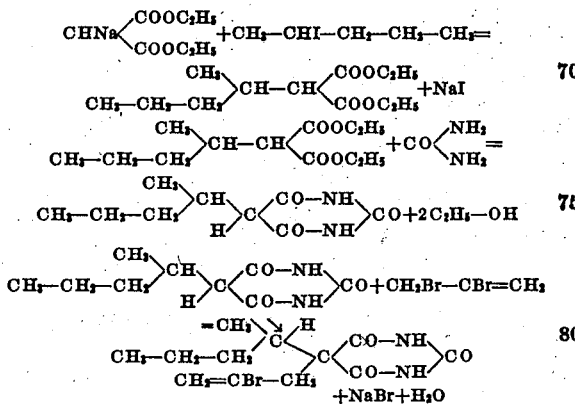

The asymmetric carbon atom is indicated by the arrow.

I claim:—

1. As new products the herein described substituted barbituric acids, in which one of the hydrogen atoms of the methylene group is substituted by a halogenated unsaturated aliphatic group, the other hydrogen atom of the methylene group is substituted by a group of the formula

in which $R^1$ and $R^2$ represent different radicals.

2. As new products the herein described substituted barbituric acids, in which one of the hydrogen atoms of the methylene group is substituted by β-halogenated unsaturated aliphatic group, the other hydrogen atom of the methylene group is substituted by a group of the formula

in which $R^1$ and $R^2$ represent different radicals.

3. As new products the herein described substituted barbituric acids, in which one of the hydrogen atoms of the methylene group is substituted by β-bromallyl, the other hydrogen atom of the methylene group is substituted by a group of the formula

in which $R^1$ and $R^2$ represent different radicals.

4. The herein described new substituted CC barbituric acid compounds in which both the hydrogen atoms of the methylene group of the barbituric acid, are substituted by monovalent organic radicals, one of such radicals contains an asymmetric carbon atom and the other of which contains a halogen.

5. The herein described new substituted CC barbituric acid compounds in which both the hydrogen atoms of the methylene group of the barbituric acid, are substituted by monovalent organic radicals, one of said radicals containing an asymmetric carbon atom, and the other being an unsaturated bromine-containing radical.

6. The herein described new substituted CC barbituric acid compounds, in which both the hydrogen atoms of the methylene group of the barbituric acid, are substituted by monovalent organic radicals, one of said radicals containing an asymmetric carbon atom, and the other being an unsaturated radical containing a halogen.

7. The herein described new substituted CC barbituric acid compounds, in which both the hydrogen atoms of the methylene group of the barbituric acid, are substituted by monovalent organic radicals, one of said radicals containing an asymmetric carbon atom, and the other being an unsaturated radical containing a halogen in the β position.

8. A CC-disubstituted barbituric acid derivative in which the hydrogen atoms of methylene group are replaced by two radicals, one being halogenated aliphatic and the other being of the general formula

in which R¹ and R² represent two different groups.

9. A barbituric acid derivative in which one of the hydrogen atoms of the methylene group is replaced by a radical containing an asymmetric carbon atom and in which the other of such hydrogen atoms is substituted by a brominated hydrocarbon radical.

10. As new products the herein described substituted barbituric acids, in which one of the hydrogen atoms of the methylene group is substituted by an unsaturated aliphatic group, and in which the other hydrogen atom of the methylene group is substituted by a group containing at least 5 carbon atoms of the formula

in which R¹ and R² represent different radicals.

In testimony whereof I affix my signature.

Dr. FRIEDRICH BOEDECKER.